INVENTOR.
WILBUR FISK
BY
Barnett & Barnett
ATTORNEYS

FIG.5.

INVENTOR.
WILBUR FISK
BY
Barnett + Barnett
ATTORNEYS

May 19, 1959

W. FISK 2,886,927

CUPPING AND PACKAGING METHOD AND APPARATUS
FOR FRAGILE FOOD PRODUCTS

Filed Aug. 8, 1955

INVENTOR.
WILBUR FISK

BY

Barnett & Barnett
ATTORNEYS

May 19, 1959

W. FISK

2,886,927

CUPPING AND PACKAGING METHOD AND APPARATUS
FOR FRAGILE FOOD PRODUCTS

Filed Aug. 8, 1955

INVENTOR.
WILBUR FISK
BY
Barnett & Barnett
ATTORNEYS

United States Patent Office 2,886,927
Patented May 19, 1959

2,886,927

CUPPING AND PACKAGING METHOD AND APPARATUS FOR FRAGILE FOOD PRODUCTS

Wilbur Fisk, Rockport, Mass., assignor to The Bianchi Co., New York, N.Y., a firm Application August 8, 1955, Serial No. 526,997

15 Claims. (Cl. 53—26)

This invention relates to methods and apparatus for cupping confections or other comestibles as units, and also for packaging such units in containers to assure intact delivery during transportation and handling for individual use distribution. More particularly the invention provides an improved method and apparatus for packaging of candies and for other like requirements.

In the confection manufacturing art, well recognized packaging methods for individual pieces, such as, candies, cakes or biscuits and other like comestibles, which are fragile, may crumble due to rough handling, or when such units contain liquids after being cupped and cartoned may be damaged causing spoilage or leakage. To assure delivery to the user of the carton contents intact, it is usually arranged to manually cup each confection for cushioning the same before placing in partitioned compartments of cartons provided by liner separators or crate-partitions, the cup and crate-partitions serving as shockproof packaging means. In practicing the present invention herein, not only is cupping of the confections to form said units automatically performed, thereby replacing the necessity of manual operation, as one dominant improvement in this art, but there is also provided through a concurrent cycle of operations for manufacture of cups as part of said shockproof packaging means as required for quantity production as well as for filling said crate-partitioned containers.

Among the objects of the invention is to generally improve the method of cupped unit packaging and the construction of apparatus of the character described, which method shall provide packaging operations that to a great extent reduce personal attention or supervision, which shall increase the hygienic and sanitary conditions of the packaging operation by eliminating handling of the product being packaged, and which apparatus shall comprise relatively few and simple parts assembled into a compact readily controlled machine for automatic operation to an extent not practiced heretofore, which shall include a cup forming portion adapted to supply a succession of cups to a packaging machine portion of new construction, such for example as in the manner herein described and shown, or to be incorporated in or combined with packaging machines of apparatus already in operation, which shall provide improved crate-partitioned carton filling portions of packaging machines that are fully automatic, that is, require no manual manipulation for use with cupped confections, which apparatus portions shall be relatively inexpensive to build, operate and facilitate packaging of quantity production outputs at reduced labor expense, and which method and apparatus shall be efficient and practical to a high degree in use.

Other objects of the invention will in part be obvious and in part hereinafter pointed out.

The invention accordingly consists of an improved method and features of apparatus construction, combination of elements and arrangement of parts which will be exemplified in the method and constructions hereinafter disclosed, the scope of the application of which will be indicated in the claims following.

The invention herein described includes features in the packaging art employing cartons having crate-partitions for cupped confection units, as for example, chocolate covered cherries or other fruits in liquid syrup or flavored liquid contents and, as here described, for chocolate enrobed confections, the latter being of the type fully described and shown as being manufactured in Bianchi Patent No. 2,592,532 and in Rapisarda Patent No. 2,657,647, granted April 15, 1952 and November 3, 1953, respectively. Such confections, when cupped, have been found heretofore to be most difficult if not impossible to be automatically packaged for delivery to the buyers intact, free from leakage due to the inherent fragile character thereof.

In the accompanying drawings in which illustrative embodiments of the invention are shown.

Figure 4:
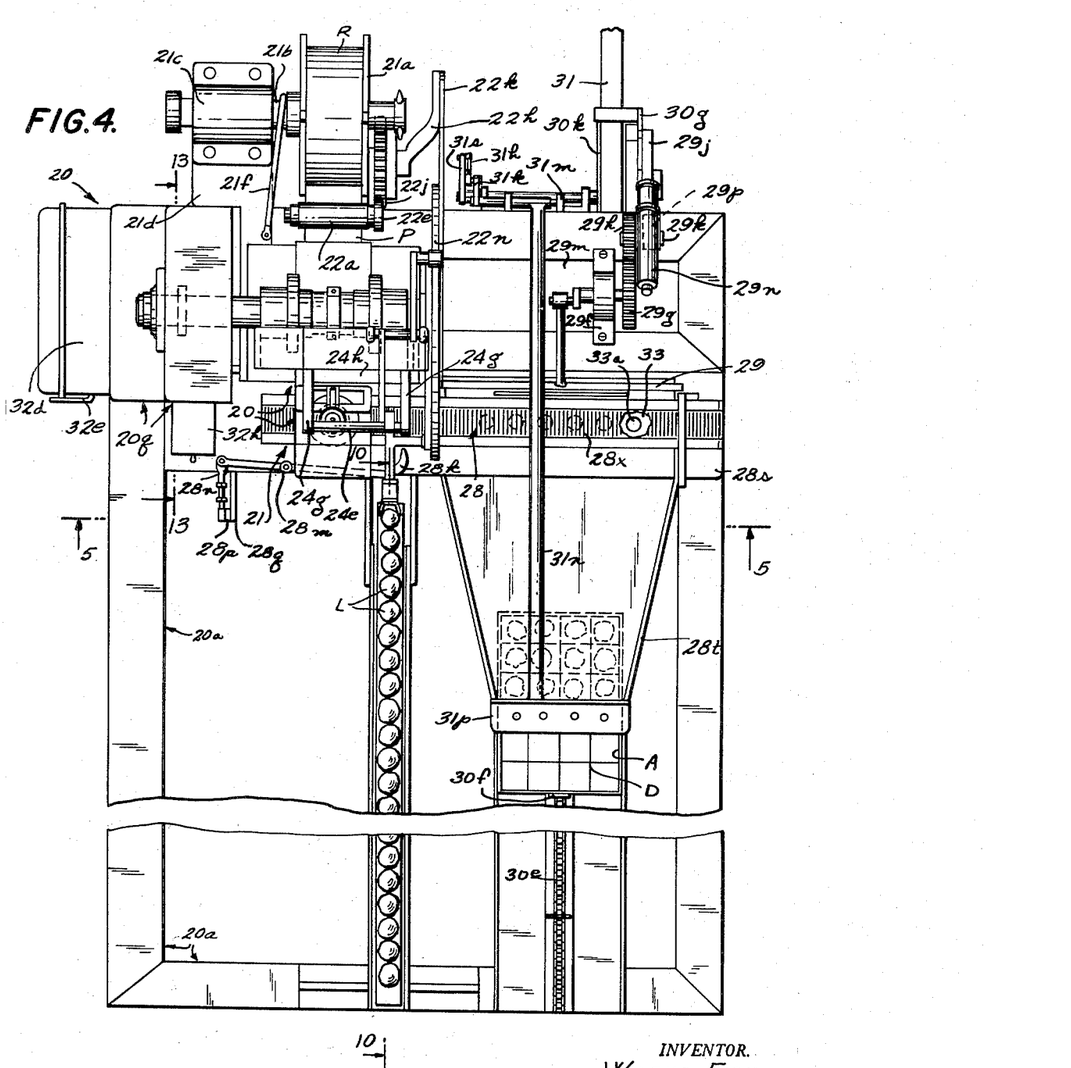
Fig. 4 is a top plan view of the improved apparatus embodying the invention, partly broken away, and with nested units removed as installed in connection and incorporated with delivery end of a confection unit and packaging carton supply means.
Figure 5:
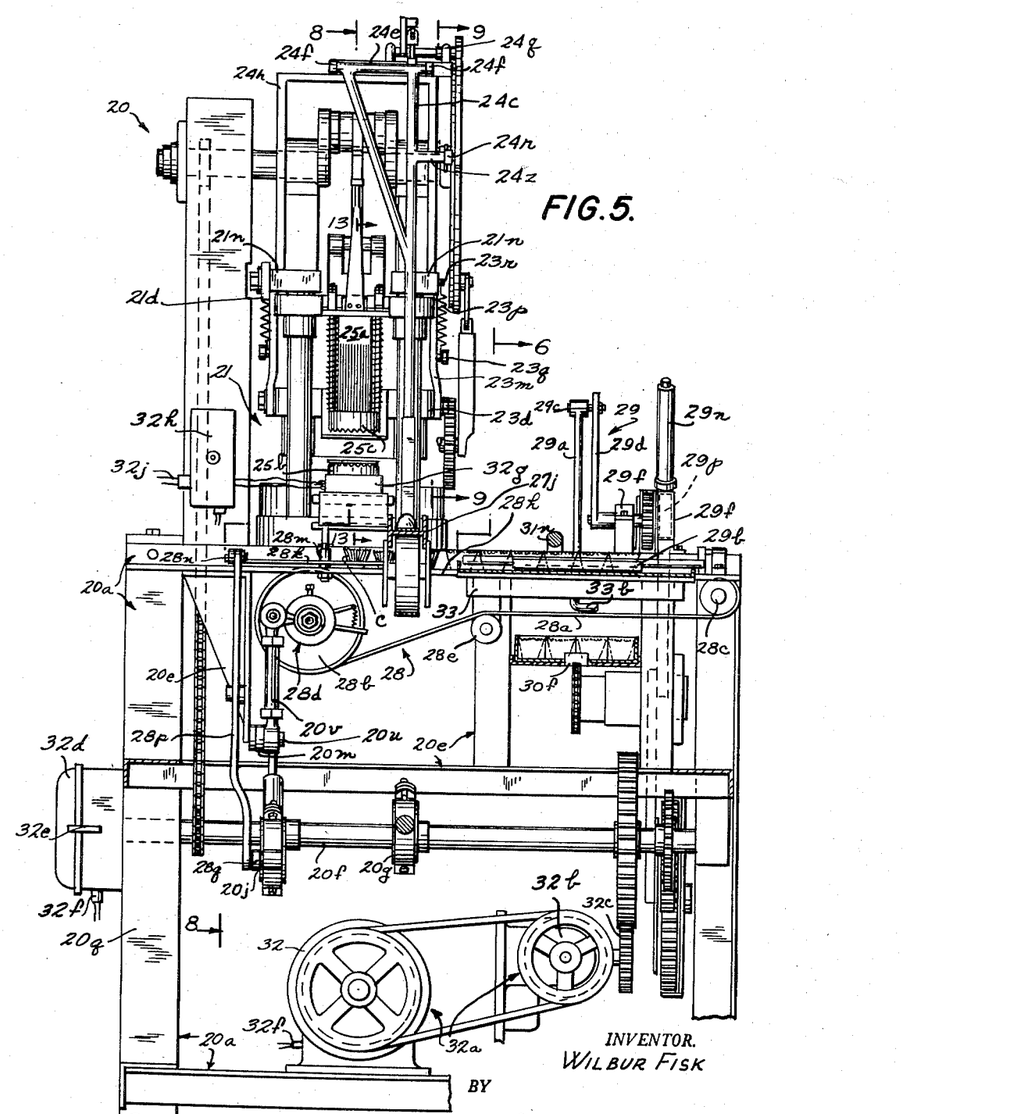
Fig. 5 is a front elevational view as seen from a plane passing through line 5—5 in Fig. 4, partly in section, showing details of the machine parts assembly of the improved apparatus with the cup forming dies in full open position.

Referring in detail to the drawing and as shown in Figs. 4 and 5, 20 denotes an improved cup forming, confection cupping and carton packaging apparatus constructed and operated by a method to embody the invention. As herein shown and described, said apparatus 20 and method are applied to handling cherries or other fruits F preserved in a liquid syrup or juice J enrobed in a chocolate shell S, commonly known as "chocolate cherries" L, such as the type shown in Fig. 7 and said Bianchi and Rapisarda patents.

Apparatus 20, which has a suitable base framework 20a formed of angle, channel and like structural beam members, may include a cup forming portion 21 which makes a succession of frusto-conical crinkled pleat-like sided or, as herein referred to as corrugated, cups C of a suitable sheet material, such as treated thin paper, plastic or metallic and metallized web P of any well understood composition unwound from a conveniently positioned supply source, such as, roll R, carried on a supply reel 21a. The latter may be mounted to turn with a short horizontally disposed laterally adjustable shaft 21b overhangingly supported in a threaded block 21c and, as here shown, from horizontally disposed angle beam 21d carried by a horizontally disposed tie plate 21n, as is clear from Figs. 4, 5 and 13. Turning movement of said reel 21a with roll R on shaft 21b may be drag controlled by any suitable means to regulate unwinding tension as required, as for example, by a suitable friction brake 21f as shown in Fig. 13 or any other well understood manner, said drag brake 21f being connected for actuation on swinging movement of H-shaped link 21g positioned therebelow.

Figure 8:
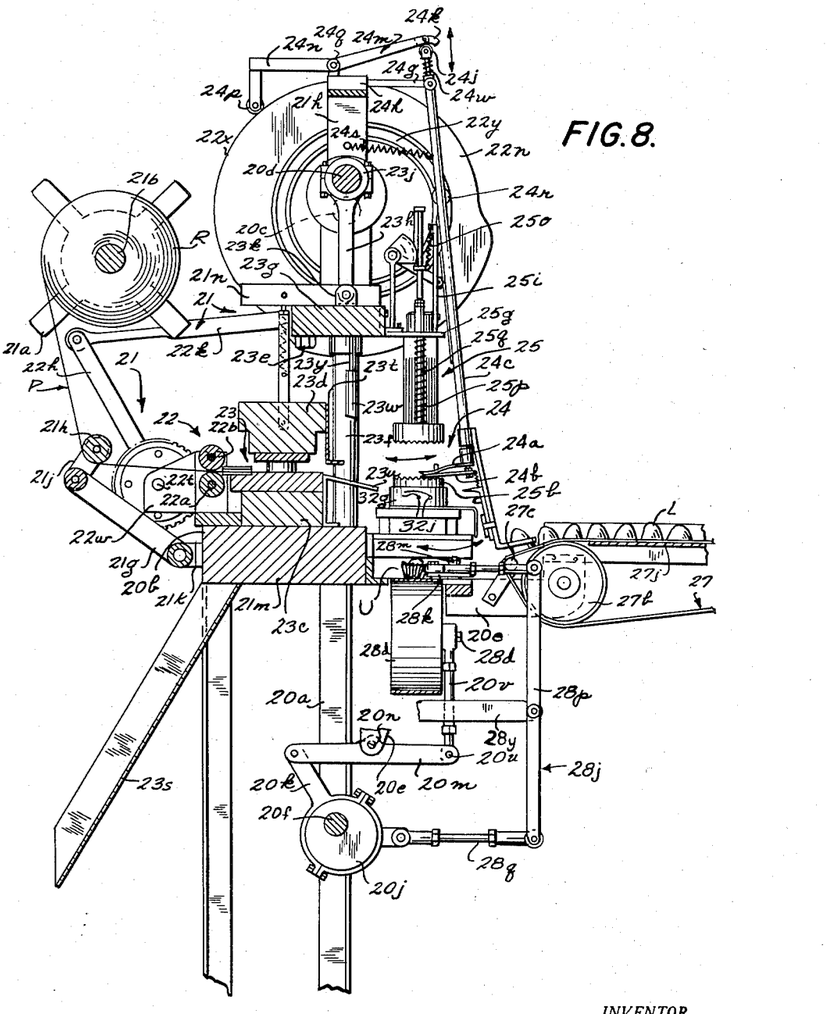
Figs. 8 and 9 are enlarged cross-sectional views taken on lines 8—8 and 9—9 in Fig. 5, partly in section, showing side elevational views of details of the machine parts assembly including the article transfer and cup forming operational means in full open position, Fig. 9 showing the intermittent feed drive for the cup sheet material.
Figures 13, 13A, 16, 17:
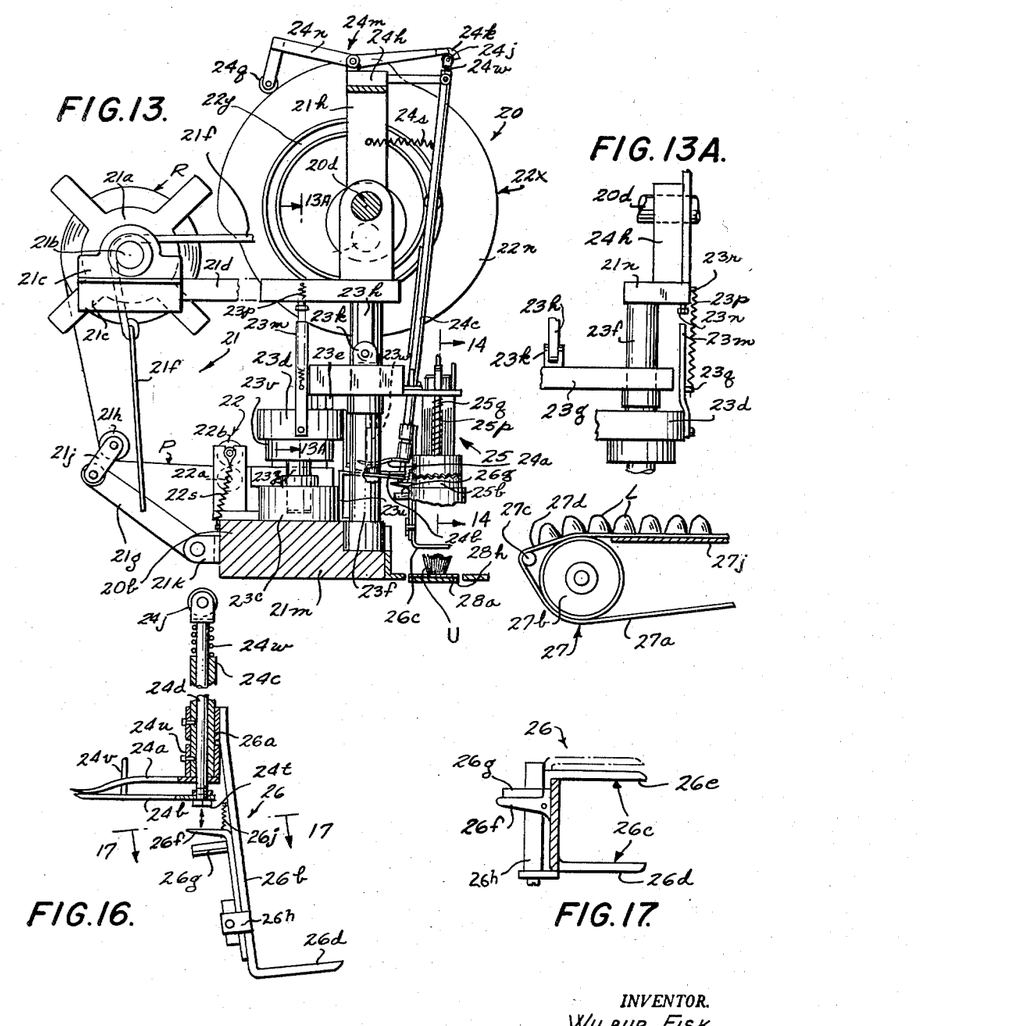
Fig. 13 is a fragmentary cross-sectional view taken on line 13—13 in Fig. 4 showing details of the machine assembly with the cup drawing dies in full closed position.
Fig. 13a is an enlarged fragmentary view taken on line 13a—13a in Fig. 13 showing details of the cutting die actuating drive in severing position.
Fig. 16 is an enlarged fragmentary side elevational view showing cup blank transfer gripper movable with the tong or claw pickup depositing carrier and cam construction for nesting a chocolate cherry confection in a cup.
Fig. 17 is a cross-sectional view taken on line 17—17 in Fig. 16 showing details of the cam tripping action of the tong carrier.

Web P may be passed down from roll R and around an idler roller 21h which is mounted to turn between spaced apart link arms 21j, the latter being swingably supported to pivot from one end of and with said H-shaped link 21g, the other end of the link 21g being trunnioned between projecting spaced apart bearing blocks 21k extending from a horizontally disposed frame base member 21m, as shown in Figs. 8 and 13.

From around the idler roller 21h, web P is passed horizontally in a relatively forward direction to an intermittently actuated feeding mechanism 22 which may be formed of a lower steel roller 22a and an upper rubber roller 22b mounted in suitable spring pressure contact provided by tension spring 22s. Said rollers 22a and 22b are horizontally disposed in the path of movement of web P for feeding the latter interposed therebetween in conformance with intermittent action of the feeding mechanism 22.

As is clear from Figs. 8, 9, 11 and 13, to produce said intermittent web feeding action in timed relation, shafts 22c and 22d on which steel and rubber rollers 22a and 22b, respectively, are mounted may be provided with meshing gears 22e and 22f, respectively. Gear 22f meshes with a drive gear 22g which is rotated through a suitable slip clutch 22j having an oscillatable arm 22h, an end of which swingably connects with an end of a push and pull rod 22k. The other end of said rod 22k may be pivoted at 22m to a mid-portion of a control cam plate 22n, the latter being mounted to turn with a power crank shaft 20c of apparatus 20. Said shaft 20c also serves to supply power for a web die cutting means 23 and a cup forming portion 24, as is clear from Figs. 1, 4, 5, 8, 9, 13 and 16.

Figures 9, 9A:
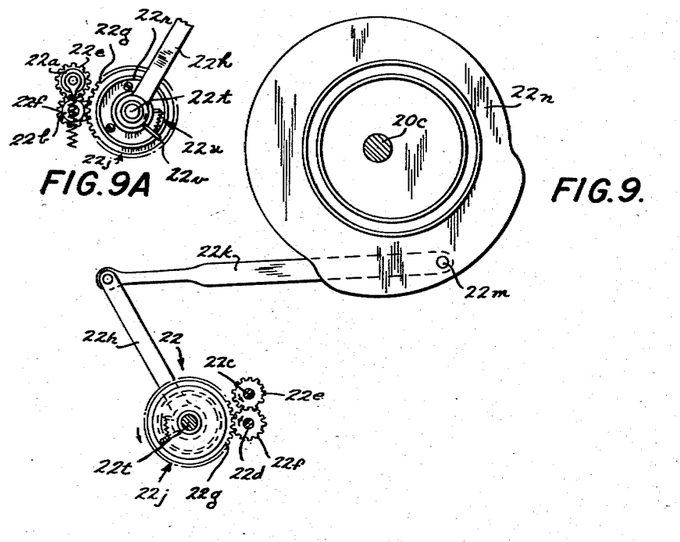
Fig. 9a is a fragmentary side view showing the side of the slip clutch gear opposite that shown in Fig. 9.
Figures 10, 10A:
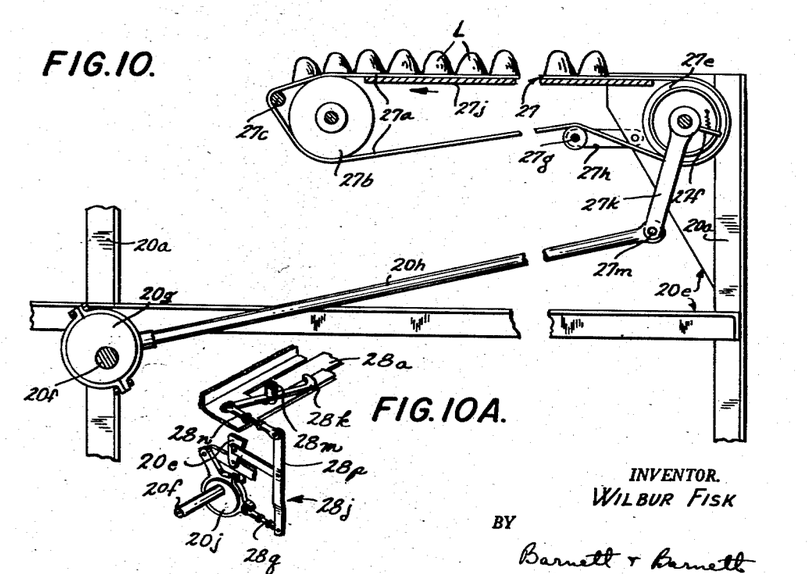
Fig. 10 is a cross-sectional view taken on line 10—10 in Fig. 4, partly broken away, showing details of the unit supply conveyor and transmission drive therefor.
Fig. 10a is a perspective view showing alignment guiding means for cup on conveyor shown in Figs. 1 and 8.

Slip clutch 22j may be made as an integral part of gear 22g and is seen from Fig. 9a to include a circular track or ledge 22r concentrically positioned with respect to a shaft 22t on which said gear 22g is mounted. A spring clutch member 22u, which has a slip motion gripping end 22v, is mounted to ride on said track 22r. The other end of said member 22u is mounted to rotate on shaft 22t so that when the arm 22h, which is connected to move with member 22u, oscillates, the gear 22g intermittently turns for controlling the timing and adjusting advancing movement of said feeding mechanism 22 in the well understood manner, said gear shaft 22t being supported by an extended hanger plate 22w, as here shown in Fig. 8.

Forwardly of intermittent feed mechanism 22, web P, as seen from Figs. 8, 11, 12 and 12a, is passed between upper movable shearing knife blades 23a and lower stationary blade edge cutters 23b which form cooperating parts of die cutting means 23. These die knife blade and edge cutter parts when open, that is, spaced apart, provide free passage for the web P during each intermittent forward movement of the latter by feed mechanism 22. Blade edge cutters 23b may be rigidly secured in position on a base plate 23c supported on an upfacing side of base supporting member 21m and shearing knife blade 23a supported thereabove from an underside extension 23v of a secondary cross head 23d, the latter being mounted to move in an up and down path below a cooperating adjustable pressure tappet 23e projecting downwardly from a primary cross head 23g. The latter, which also is constructed to move up and down, operates die cutting means 23 to cause said secondary cross head 23d with said shearing knife blades 23a to be actuated toward blade cutters 23b for effectuating severance of the interposed portion of web P during the end stroke downward movement of the primary cross head 23g after the tappet 23e strikes the secondary cross head 23d. The latter is mounted to ride on a pair of vertically extending spaced apart parallelly aligned supporting slideway posts or guide rails 23z having the lower ends thereof rigidly anchored in and upstanding from said base supporting plate 23c, as is clear from Figs. 8 and 13.

Primary cross head 23g may be mounted to ride on another pair of vertically extending spaced apart supporting slideway guide posts or rails 23f parallelly aligned with said part of secondary cross head rails 23z and forwardly thereof. Said rails 23f have opposite ends thereof rigidly anchored between base supporting member 21m and saddle tie plate 21n.

To give the required reciprocating movement to primary cross head 23g there may be provided a connecting rod 23h having one end thereof terminating in an eccentric bearing end 23j which is mounted on throw portion 20d of said power shaft 20c. The other end of said connecting rod 23h engages, in operative alignment, with a pivoting fitting 23k carried on the upfacing side of said primary cross head 23g, as is clear from Figs. 1 and 8.

Since secondary cross head 23d is power actuated only through a portion of the downward movement of the primary cross head 23g, suitable upward or return movement of secondary cross head 23d may be provided by a spring attachment mechanism, for example, as shown in Figs. 8, 13 and 13a. Said mechanism is thus seen to include a pair of elongated bumper extensions 23m secured to upstand in spaced apart vertical alignment from opposite ends of the secondary cross head 23d. The upper or free ends of said bumper extensions 23m are located to move into abutment with adjustable contact or screw stops 23n carried by the saddle tie plate 21n for limiting the travel of said secondary cross head 23d and consequently the movement of shearing blades 23a. A balancing upward or return movement is accomplished by providing tension springs 23p, each of which has one end anchored to a mid-portion of bumper extension 23m as at 23q, the other ends of said springs 23p being secured to the saddle tie plate 21n as at 23r.

Figure 2:
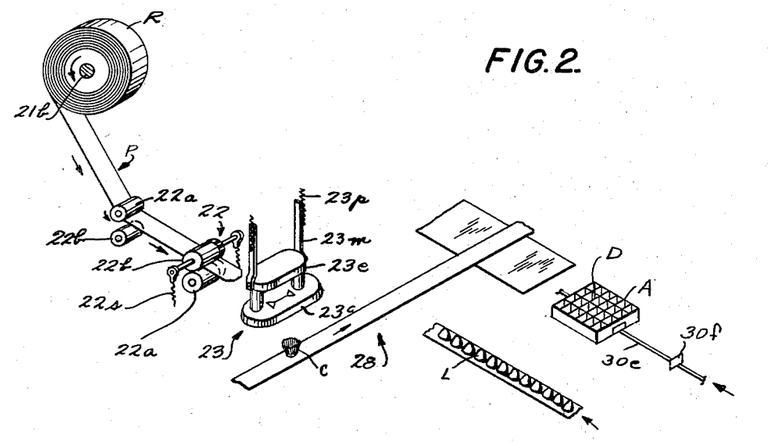
Fig. 2 is a fragmentary diagrammatic perspective view showing details of the relatively directional path movements of the materials and apparatus parts including conveying means of the supplied candy units, cup forming material, packaging cartons as well as indicating a portion of the cup forming operation as employed with the apparatus parts shown in Fig. 1 including the web cutting dies.
Figures 3, 3A:
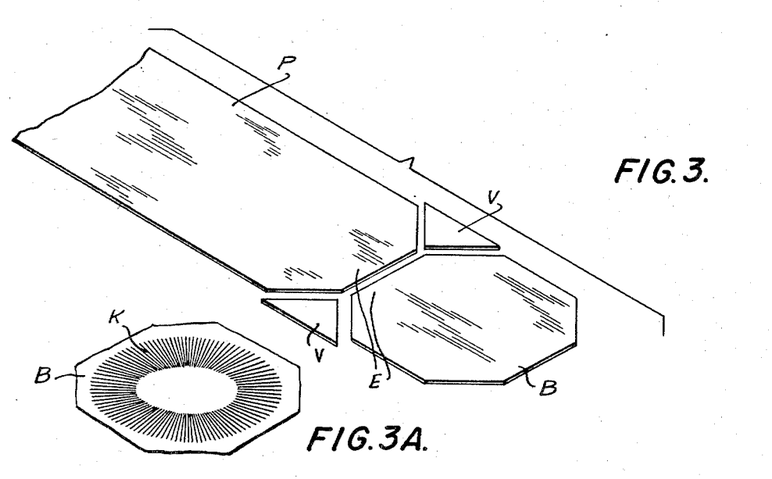
Fig. 3 is an enlarged fragmentary perspective view to show the severing operation performed on a strip portion of the sheet material web supply prior to forming successive cups shown in Fig. 2.
Figs. 3a and 3b are enlarged perspective views of a preformed impressed paper blank following the severing operations, shown in Fig. 3, and a cup drawn therefrom as indicated in Fig. 2, respectively.

The operative movement of the die cutting means 23 is constructed and arranged to conform with requirements of efficient service and to the timing relation with operative movement of all the other portions of apparatus 20. For it is seen that web P, after being fed to and acted on by the die cutting means 23, as described above and shown in Figs. 2 and 3, provides a consecutive series of octangular-shaped cup forming blanks B by symmetrically through-cutting the opposite edges of the web P with similar reentrant triangular sections V extending a part way distance across the width of the web P and concurrently through-cutting an unsevered web mid-portion at E from apex to apex of oppositely positioned triangular sections V by correspondingly disposed pairs of said shearing knife blades 23a and blade edge cutters 23b. Each leading blank B after being cut by the die cutting means 23 is then passed into a guiding passageway formed by a pair of angle-plates 23t and 23u that are supported from base plate 23c and secondary cross head 23d, respectively, and hence to the cup forming portion 25.

For advancing blank B forwardly through said passageway, there is provided an intermediate transfer gripper 24 and, as is clear from Figs. 8 and 13, cooperates with said lower angle plate 23u which serves as a shelf whereover the blank B rides, the horizontal portion of said plate 23u being disposed in a forwardly sloping position to clear companion fingers 24a and 24b of transfer grippers 24 during the latter's rearward movement. Upper angle plate 23t may be shaped or cut away and positioned for permitting blank B to be intermittently retained against accidental displacement from the path of movement of said gripper fingers 24a and 24b by a drop weight 23w. The latter, as seen from Fig. 8, is carried to move with primary cross head 23g by a vertically disposed aligning rod 23y. Said weight 23w and rod 23y may have a suitable loose sliding interconnection so constructed, proportioned and arranged to be free for exerting pressure on the blank B positioned on the angle plate shelf portion of plate 23u during the end of the lowering stroke of said cross head 23g for assuring that the blank B is held against movement from the proper position to be seized by the gripper fingers 24a and 24b yet said weight 23w being lifted on the upstroke of said cross head 23g free from interfering with the advancing movement of the blank B through said passageway to cup forming portion 25.

As seen from Figs. 5, 8, 13 and 16, said gripper 24 includes the pair of cooperatively mounted companion fingers 24a and 24b swingably supported to terminate the lower ends of an elongated vertically extending tubing 24c and a push rod 24d, respectively. The latter extends axially through said tubing 24c which has an upper end thereof formed with a braced horizontally disposed shaft portion 24e trunnioned between spaced apart bearings 24f supported to forwardly project from bracket arm 24g, the latter being rigidly supported to extend from an upstanding bridging frame member 24h spanning across front end portions of saddle tie plate 21n.

The upper end of push rod 24d projects beyond the tubing 24c and may terminate in a follower roller 24j which, by means of a suitable compression spring 24w, is pressure forced against an end surface portion of a forwardly extending rocker arm 24k of a bell-crank 24m. The other rocker arm 24n which extends rearwardly may also terminate in a follower roller 24p which rides on cam surface 22x provided on the periphery of said cam plate 22n. Bell crank 24m may be pivotally supported from bridging frame member 24h in any suitable manner, as by a trunnion bearing fitting 24q.

As is clear from Figs. 4, 5, 8, 9 and 13, for swinging said transfer gripper 24 in trunnion bearings 24f, tubing 24c may be provided with a horizontal extension 24z formed on a mid-length portion thereof which terminates in follower roller 24r. The latter rides in cam trackway 22y provided on a side surface of cam plate 22n. To give steadiness and smooth operation to transfer gripper 24, a tension spring 24s may be mounted for action between a mid-portion of tubing 24c and an upright portion of bridging frame member 24h. Gripper finger 24a, which may be made of flat metal strip material, is rigidly secured to extend laterally from the lower end of the push rod 24d by any suitable means, as for example, by a threaded lock nut attachment 24t projecting down beyond and clear of the lower end of tubing 24c which carries gripper finger 24b. The latter may be made of bowed spring metal and is rigidly secured by one end thereof to tubing 24c by a suitable socket fitting or set screw fastened sleeve 24u and held in cooperative movable position by a shackling alignment pin 24v upstandingly carried by gripper finger 24b to extend through gripper member 24a for permitting operative separation movement therebetween above and below the level of the path of movement of the cut blank B. Gripper fingers 24a and 24b are normally retained in resilient contact by compression spring 24w which may encircle the upper end of push rod 24d and extend between extreme upper end of tubing 24c and follower roller 24j, as is clear from Figs. 8, 13 and 16.

On said lower end of tubing 24c, there may also be attached a set screw fastened sleeve mounting 26a for a confection pickup-depositing carrier 26, shown in detail in Figs. 16 and 17.

Cup forming portion 25, which through the operation of intermediate transfer gripper 24 receives said blank B cut by die cutting means 23, may comprise suitable drawing means, such for example, as shown in Figs. 3a, 3b, 5, 8, 13 and 14, to include a compounded set of dies comprising a male or die plunger body 25a, a complementary female or cavity die 25b and a preforming crimp die stamper part 25c associated with said die plunger body 25a, the latter being constructed and arranged to cooperate with a crimp preforming flanged portion of the cavity die 25b.

Die plunger body 25a may be made of metal having an elongated cylindrical shape which is vertically mounted by an upper end thereof and formed with a central axial bore 25d wherethrough there is mounted for sliding movement a push rod 25e. The latter terminates at a lower end thereof in a header 25f sized and shaped to correspond to the configuration of the bottom side of cup C. Said die plunger body 25a with the push rod 25e and header 25f are supported to extend down in an overhanging position from a plate bracket 25g that is rigidly secured to move with primary cross head 23g. The cylindrical outer surface of plunger body 25a and inner surface portion of cavity die 25b may be correspondingly fluted as at 25h and 25j, respectively, to produce crimped corrugations of a required or predetermined contour for the tapering side walls W of cup C. To the lower end outer portion of the fluted plunger body 25a, the die stamper part 25c may be loosely attached, said stamper part 25c also being fluted on a down-facing side thereof as at 25k to correspond to radially extending flutes provided on the upfacing side portion of cavity die 25b as at 25m. The fluted configuration plunger body portions 25m and 25j are formed in a continuous pattern for mating with plunger body flutes 25h and stamper part flutes 25k, as is clear from Figs. 14 and 15.

The attachment of said die stamper part 25c with plunger body 25a may be of the loose sliding connection telescopic type retained in alignment through spaced apart coupling guide centralizer 25n, which construction serves to compensate for differences or irregularities in web thicknesses, cup drawing stress and to permit conformance to requirements arising to assure smooth and continuous cup forming operations. To produce proper cooperative action during the cup drawing operation between the loosely mounted stamper part 25c and the cavity die 25b, there is interposed between the latter and plate bracket 25g a pair of coil compression springs 25p carried on spindles 25q in parallel spaced apart alignment with respect to plunger body 25a disposed therebetween, as is clear from Figs. 5, 8 and 13.

Figures 11, 12, 12A, 14, 15:
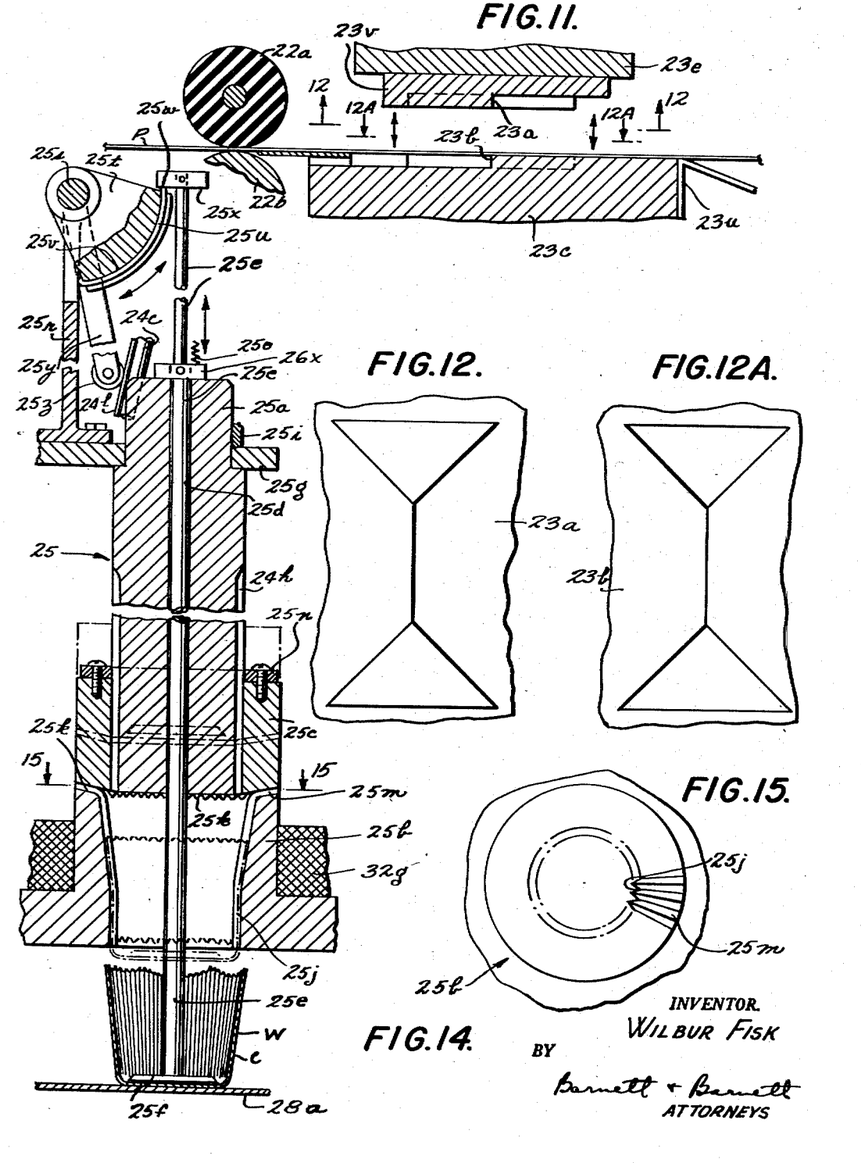
Fig. 11 is an enlarged fragmentary cross-sectional view showing details of the cup sheet material web cutting dies and mounting corresponding to that shown in Fig. 8.
Figs. 12 and 12a are downfacing side of the upper portion and the upfacing side of the lower portion of the web cutting dies as seen from lines 12—12 and 12a—12a, respectively, in Fig. 11 showing details of the knife edge arrangement.
Fig. 14 is an enlarged cross-sectional view taken on line 14—14 in Fig. 13 but showing in full lines the preforming blank dies in a closed position with the completed cup, as discharged projected through the crinkling drawing die, the positional intermediate and movement limits of the plunger die being shown in dot and dash lines.
Fig. 15 is a view of an enlarged upfacing side of the bottom preforming blank dies, partly diagrammatic, as seen from line 15—15 in Fig. 14.

Cup forming portion 25 may be actuated by providing to upstand from plate bracket 25g a stanchion 25r which pivotally supports on a free end thereof as at 25s a pulley segment 25t having a cable 25u anchored at one end thereto, as shown in Fig. 14. Cable 25u winds and unwinds from an arcuately shaped grooved edge surface 25v of said segment 25t and has the other or free end 25w of cable 25u connected to move with an upper finial fastener 25x of push rod 25e which extends up beyond plunger body 25a.

Pulley segment 25t may be made to swing with movements of an attached arm 25y pivoting on end 25s. Said arm 25y may terminate in a follower roller 25z which rides on a track cam 24l provided to extend along a mid-length of said tubing 24c. To normally urge push rod 25e toward its extreme raised or elevated position when the dies of the cup forming portion 25 are in open position, shown in Fig. 8, a tension biasing spring 25o may be provided, one end of which is anchored to an upper or free end of a suitable supporting bar 25i secured to upstand from plate bracket 25g, the other end of said spring 25o being attached to a collar stop 26x mounted on a mid-portion of rod 25e, as shown in Fig. 14.

Confection pick-up-depositing carrier 26, as seen from Figs. 16 and 17, has a down-reach arm 26b secured to sleeve mounting 26a for locating a pair of claws or tongs 26c terminating said arm 26b as an extension to blank transfer gripper 24 below the lower end of push rod 24d. Said pair of tongs 26c comprises a fixed prong or fork 26d integrally formed with arm 26b and a displaceable parallelly aligning companion prong or fork 26e mounted on arm 26b for spreading or shifting movement by pivoting at 26g with respect to fork 26d when depositing a chocolate L carried by tongs 26c during the cupping operation. Said companion fork 26e may have an upwardly and rearwardly projecting control extension 26f positioned in aligned arrangement in the path of movement of the lower end of push rod 24d for actuation thereby to release a chocolate L lifted by carrier 26 when the latter swings in depositing position over a cup C supplied by cup forming portion 25 onto a cross conveyor 28 and concomitantly when gripper fingers 24a and 24b are effective to seize the blank B on shelf and angle plate 23u, as is clear from Figs. 1, 2, 4, 5, 8 and 13. To retain said forks 26d and 26e in effective cooperative sliding relation, a band and guide fitting 26h may be provided below said pivot 26g, and a spring 26j positioned for forwardly urging forks 26d and 26e toward each other, as shown in Figs. 16 and 17.

Pick-up-depositing carrier 26, as seen from Figs. 1, 4, 8, 10 and 13, automatically operates to remove chocolates L intermittently advancing in timed relation on belt 27a of a conveyor 27 supplied to the latter from a conveniently arranged source, an upper portion of said belt 27a passing over a level retaining plate 27j. Said conveyor 27 extends in spaced alignment with respect to the path of swinging movement of carrier 26 and is seen to include a head pulley 27b; an auxiliary advancingly positioned pulley 27c, the latter providing take-off means as at 27d, on a leading portion of conveyor belt 27a; a drive tail pulley 27e which may be constructed and arranged with a slip clutch 27f similar to gear 22g with slip clutch 22j of web feeding mechanism 22 above described; and a belt tightening idler pulley 27g. The latter may be supported on an adjustable bracket arm 27h from under framework members 20e which also may support the head, auxiliary and tail pulleys 27b, 27c and 27e and the respective mountings thereof as well as leveling plate 27j.

Power transmission for operating conveyor 27 intermittently through drive tail pulley 27e and slip clutch 27f is provided by an eccentric 20g mounted on a mid-portion of a main power shaft 20f, said eccentric 20g having a reach rod 20h which pivotally connects with an end of an oscillatable arm 27k of slip clutch 27f as at 27m.

Cups C passing from said forming portion 25 reaches a nesting operation position where each chocolate L is inserted into a cup C, that is, delivered by the pickup-depositing carrier 26 from conveyor belt 27a. Said nesting operation takes place on a cross conveyor 28 having a belt 28a which extends along the front of apparatus 20 to pass directly under cavity die 25b of cup forming portion 25 and the depositing position of carrier tongs 26c, as is clear from Figs. 4, 5, 8 and 13, an upper portion of said belt 28a passing over a level retaining plate 28h. Conveyor 28 may include a head pulley 28c; an intermittently driven tail pulley 28b which may be constructed and arranged with an adjustable slip clutch 28d similar to said gear 22g with slip clutch 22j of web feeding mechanism 22; and a belt tightener idler pulley 28e. The latter, as well as head and tail pulleys 28c and 28b, respectively, and level retaining plate 28h may be supported on portions of framework 20a and under framework 20e.

Power transmission for operating cross conveyor 28 intermittently through said tail pulley 28b and slip clutch 28d is provided by a dual acting eccentric 20j mounted on said power shaft 20f, eccentric 20j having a short upward extending rod 20k which pivotally connects with an end of a cantilever beam or seesaw bar 20m. The latter may also be supported for tilting along mid-portion 20n thereof from framework 20a and has the other end thereof pivotally connected at 20u to an end of a length adjustable oscillatable arm 20v extending down from said slip clutch 28d.

To assure having cups C brought to register in a proper aligning position on cross conveyor 28 for the nesting operation to insert chocolate L into cup C, a swingable stop barrier or gate 28j having a hooked free end 28k may be pivoted at a mid-portion thereof, as at 28m, for movement with said hooked end 28k in the path of travel of the cup C, above conveyor belt 28a. The operation of said gate 28j is such as to intermittently intercept, if necessary, in timed relation, each cup C for locating the latter in said registering nesting alignment, and for removing the gate 28j to permit further travel of the nested chocolate as a unit U to proceed with movement of the conveyor belt 28a for packaging in a carton or box A, the latter being subdivided by a crate-partition liner D into compartments to accommodate each unit U individually in shockproof retention. The other end of said barrier or gate 28j may, through pivotally secured link and lever elements 28n and 28p, respectively, be connected with a horizontally extending reach rod 28q of said dual eccentric 20j, lever element 28p being pivoted at a mid-portion thereof to the end of an arm 28y, the other end of the latter with said bar mid-portion 20n being supported by a downreach frame portion 20e, as is clear from Figs. 1 and 10a.

Figure 6:
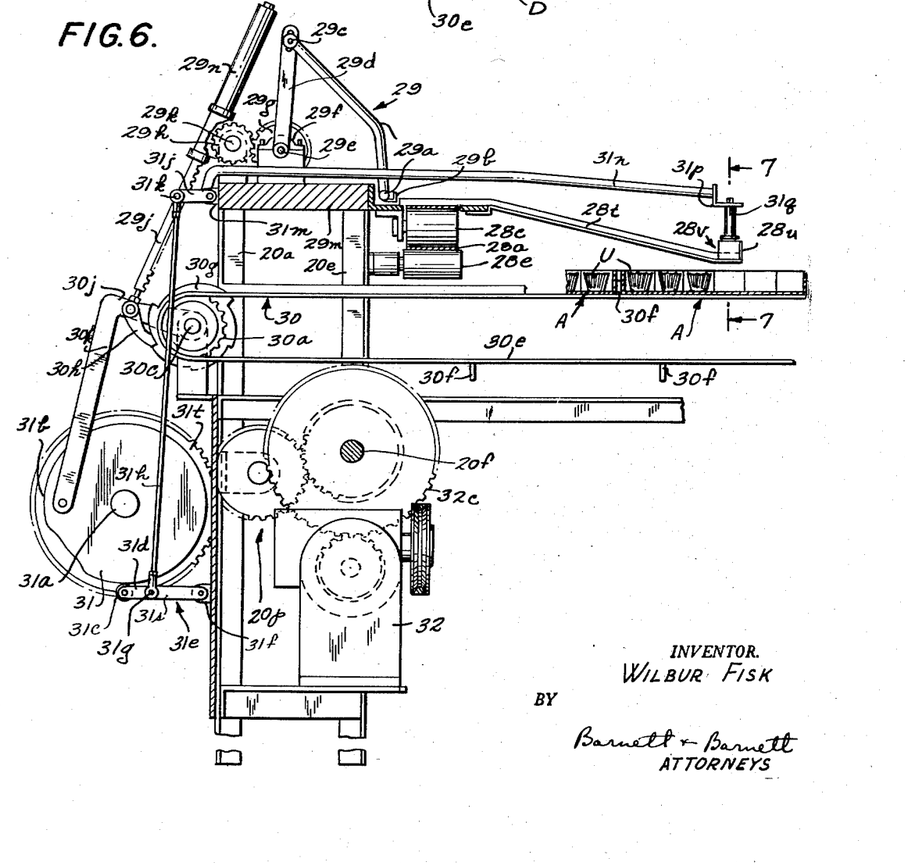
Figs. 6 and 7 are enlarged side elevational and cross-sectional views, respectively, broken away and partly in section, taken on lines 6—6 and 7—7 in Figs. 5 and 6, respectively, Fig. 6 showing details of the drive transmission for the box conveyor and unit packaging means and, except in Fig. 7, the carton filling operation is shown with the units in full lines positioned in the stalls after being thrust by the plungers to enter into the size gaging template means formed by the through-passage leading into the box compartment and in dot and dash lines indicating the progress movement limits of the units.

As shown in Figs. 4, 5 and 6, after a number of said units U, corresponding to the number of box compartments in a row that are provided to be filled, have passed the gate 28j and extend along the conveyor belt 28a over a shelf 28s and within an open wide end of a funneling ramp 28t, said row of units U are slidingly moved onto the ramp by a pusher vehicle 29. Said ramp 28t is inclined downwardly and forwardly and may be formed with a narrow end opposite said wide end, said narrow end having an upstanding wall 28u formed with a row of vertically disposed stalls 28v corresponding in number to said box compartment row, each stall 28v being shaped and sized to snugly receive one of said units U therein. The portion of said ramp 28t extending along said narrow end thereof may be provided with horizontally disposed through-openings or passages 28w aligned with the lower end portions of stalls 28v so that when each unit U slides into a stall 28v the cup C thereof which is of frustro-conical shape and has a downwardly tapered side will frictionally retain the unit U in stall 28v with the bottom end of the cup C in registered alignment with passages 28w in position to be pressure forced therethrough, as is clear from the full and dot and dash line positions of the units U shown in Figs. 6 and 7.

Power transmission for intermittently actuating said pusher vehicle 29 is provided, as is clear from Figs. 1, 4, 5 and 6, with a push arm 29a terminated at a free end thereof by a bumper bar 29b which thrusts the row of units U off the conveyor belt 28a, down ramp 28t and into stalls 28v in said registered aligning position with passages 28w. The other end of said arm 29a may be adjustably pivoted by a slot and screw connection 29c with an end of an oscillating arm 29d. The latter may have the other end thereof mounted to turn with a shaft 29e journaled in bearing 29f, said shaft 29e having keyed thereto a gear 29g which meshes with a gear pinion 29h and mounted to turn therewith another gear 29p that is actuated by a toothed rack 29j. Said pinions 29h and 29p may be mounted to turn on a shaft 29k which with said journal bearing 29f may be supported on a horizontal base plate 29m that is rigidly secured to upper end portions of framework 20a and 20e. Also carried about shaft 29k there is provided a guiding scabbard or shield fitting 29n wherethrough an upper portion of rack 29j moves, a lower end of said rack 29j being length adjustably connected for varying the oscillating movement given to a free end 30j of a reach or connecting bar 30k to associate with timed movements of the intermittently driven power transmission for a chain conveyor 30.

Figure 1:
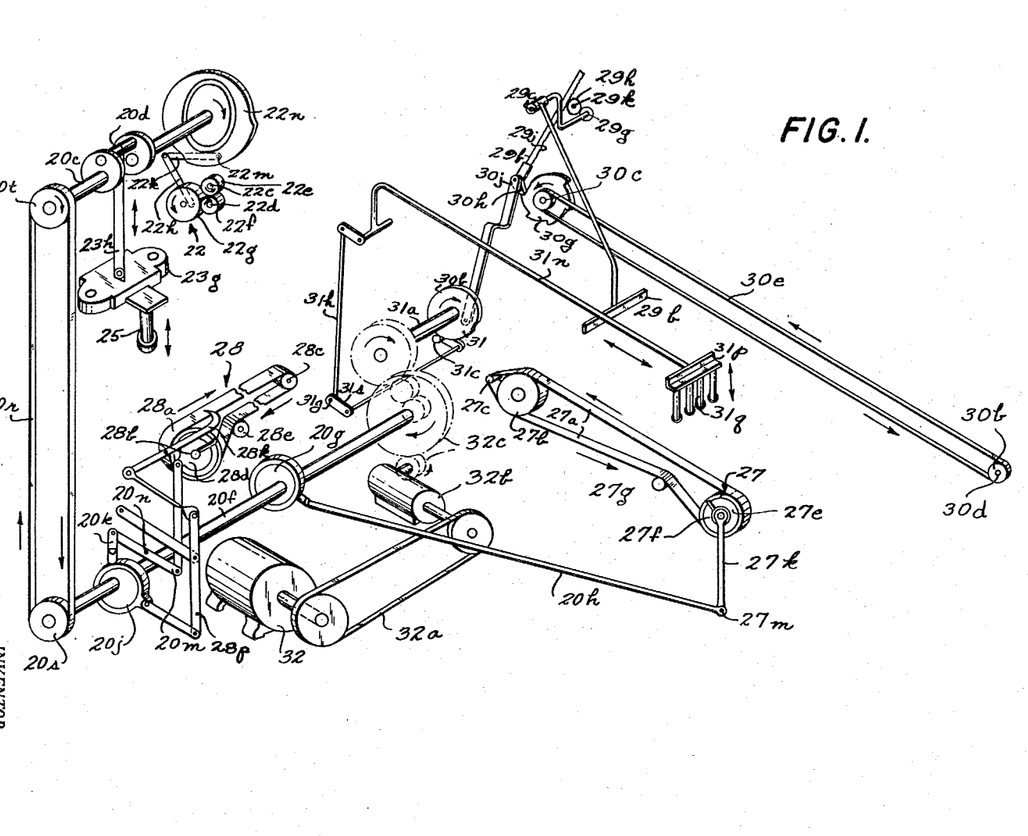
Fig. 1 is a fragmentary diagrammatic view in perspective layout showing parts of the improved apparatus including the drive transmission and integrated machine parts with the exception of paper cutting dies arranged to facilitate following the combined operation and method embodying the invention.

The latter, as seen from Figs. 1, 2, 4, 6 and 7, may extend in spaced parallel alignment with respect to said conveyor 27 and includes a drive head and a tail sprocket 30a and 30b, respectively, mounted on shafts 30c and 30d, respectively, and a chain belt 30e having uniformly spaced apart carton spacing link 30f which retains crate-partitioned boxes A in proper aligned sequence for packaging operations therein. Drive sprocket 30a and a ratchet wheel 30g having teeth which are designed to control the movement of the conveyor 30 to correspond to required spacing arrangement of said links 30f, as seen in Figs. 1 and 6, may be mounted on shaft 30c to turn together when ratchet wheel 30g is actuated through a pawl 30h constructed and arranged to swing reach bar end 30j. The other end of reach bar 30k may pivotally connect with a mid-portion of a plate cam 31 for relatively eccentric movement with respect to a short countershaft 31a on which said plate cam 31 is mounted.

Said short countershaft 31a, plate cam 31 and a driven gear 31t mounted to turn therewith form part of an extension of the power drive transmission taken from the main power shaft 20f through a properly selected train of gears denoted generally at 20p, said power drive extension not only operating vehicle pusher 29 and chain conveyor 30, but also serving to operate a pressure forcing or tamping means to insert a row of aligned units U from registered aligning positions in stalls 28v to be fully inserted in shockproof positions within the crate-partitioned boxes A.

As is clear from Figs. 1, 4, 6 and 7, said tamping means operating through plate cam 31 may have the peripheral surface or contour 31b thereof shaped to function as an actuating track on which a follower roller 31c terminating a swing arm 31d rides, the latter being a portion of a bell crank 31e which is cradled between a pair of bearing blocks 31f on a level with a lower portion of plate cam 31 and has a rocker arm 31s spaced from the swing arm 31d. To the free end of rocker arm 31s, there is pivotally connected, as at 31g, one end of an upwardly extending reach rod 31h, the other end of the latter pivotally connecting with a swing arm 31j on a rocker shaft 31k that trunnions on bearing blocks 31m projecting rearwardly from machine base frame. Rocker shaft 31k has extending forwardly thereof to move therewith an elongated handle member 31n terminated by an angle cross support 31p carrying a row of downwardly projecting plug plungers 31q so constructed and arranged to loosely fit down into and out of the row of stalls 28v for said pressure forcing action given units U during the carton packaging operation above described whereby retraction, that is, raising of said plungers 31q gives successive rows of units U free access into vacated stalls 28v.

Power to turn main drive shaft 20f may be obtained from any suitable supply source and, as here shown in Figs. 1, 5 and 6, is provided by an electric motor 32 and, if required, through belted pulleys 32a, reduction speed means 32b and meshing gears 32c of any well known make and in the well understood manner. For convenience of starting and stopping motor 32, there may be provided a switch box 32d in which electrical control equipment of standard construction is housed and having a control handle 32e mounted on a guard sheathing 20q rigidly mounted to enclose a chain drive 20r extending between sprockets 20s and 20t mounted to turn an end of crank shaft 20c from an end of main power shaft 20f, respectively.

Suitable wiring 32f for connecting said motor 32 to the power supply source through said switch box 32d may be provided in the well understood manner.

For conditioning the blanks B during the cup drawing operation to give best results, suitable heating means may be provided, such as, for example, an electric heater 32g applied to the cavity die 25b, said heater 32g being connected to the power supply source through a suitable electrically equipped switch and light signal box 32h by wiring 32j, all of standard make and in the well understood manner, the signal and switch box 32h being mounted on a front facing side of said guard sheathing 20q, if desired.

From the above description and drawings, the invention will now be apparent. After the apparatus 20 has been constructed and assembled ready for operation, a roll R of sheet material is mounted on reel 21a and the web P passed down around idler roller 21h between lower steel roller 22a and upper rubber roller 22b of the intermittent feed mechanism 22, and the leading end portion thereof through the free passage provided between upper movable shearing blades 23a and lower stationary edge cutters 23b of the die cutting means 23 when in open position. The switch and light signal box 32h may then be thrown into circuit energizing electric heater 32g from the power supply source whereby the dies of the cup forming portion 25 are brought to a properly controlled working temperature. Said heater 32g may be equipped with a thermostat for regulating the temperature in the well understood manner, and preparatory to starting production, boxes A each provided with crate-partitions D into which rows of nested chocolate cherry units U are to be packed are supplied to the chain conveyor 30 in sequence to be automatically fed in timed relation in the manner hereinafter described. Also preparatory to starting chocolate cherries L or other like comestibles which are to be nested in cups C to form units U, said cherries L are supplied in a row on conveyor belt 27a to be automatically picked up from the latter and deposited in cups C aligned on cross conveyor belt 28a by pickup and depositing carrier 26.

The sequence and cycle of operation of apparatus 20 will commence on energizing motor 32 by throwing switch box control handle 32e for connection in circuit with the electric power supply.

The construction and assembly of the interconnected portion of apparatus 20 as described above and shown in the drawings will in proper timed sequence cause the web P to be unrolled from roll R on reel 21a by the intermittently driven feed mechanism 22 of cup forming portion 21. As is clear from Figs. 8 and 13, the leading end of web P after reaching the forwardly positioned side of the die cutting means 23 and during the dwell of the intermittent drive movement of feed mechanism 22, is acted upon by lowering of the upper shearing knife blades 23a to coacting with the lower blade edge cutters 23b to sever, that is, stamp out blank B from which the cup C is to be formed. The triangular-shaped edge sections V cut from edges of web P drop down chute 23s for disposal as waste.

The blank B when severed from the leading end of the web P has advanced, as is clear from Figs. 2, 3, 8 and 11, to rest in the passageway between angle plates 23t and 23u from which position the blank B is picked up in proper timed relation by the transfer grippers 24 and drawn between male plunger die 25a carrying preforming crimp stamper part 25c and the female cavity die 25b which are then in open receiving position. As the cup forming portion 25 continues in operation, crimp stamper part 25c descends to coact with the upfacing flanged part on the cavity die 25b and imprints blank B with radially extending crimped formation K. Said dies 25a and 25b then become effective and on the down movement of the plunger die 25a with push rod 25e and the header 25f carried therewith draws the cup C completing the formation thereof and continues to move the cup C beyond the cavity die 25b short of delivery of the cup C onto the cross conveyor belt 28, then push rod 25e and header 25f carried thereof are caused to descend a further short distance to ensure freeing the cup C from cavity die 25b releasing the completely formed cup C to travel with the conveyor belt 28, as is clear from Figs. 2, 3, 3a, 8 and 15.

Figure 3B:
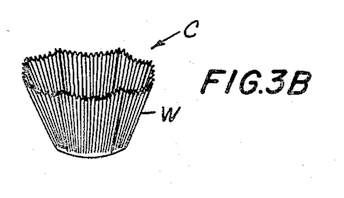
Figure 7:
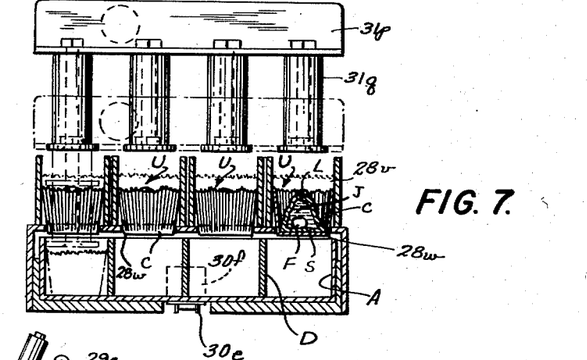

It should be noted that because the crimped side walls of the cup C are frustro-conical shaped tapering downwardly to the bottom side thereof, a serrated contour open side with wave-like contour is provided which corresponds to the polygonal shape of the blank B, thus providing a pleasing composite design enhancing the appearance of packaged chocolate cherry L nested in cup C, as is clear from Figs. 3b and 7.

As cross conveyor 28 moves intermittently and in timed relation with the delivery of cups C from forming portion 25, said cups C arrange themselves in spaced apart relation in a row. As each cup C advances in alignment with the path of movement of the carrier tongs 26c, a chocolate cherry L is picked up from conveyor belt take off portion 27d and deposited in timed relation to nest in the cups C which forms unit U, as is clear from Figs. 4, 8 and 13.

To more positively assure said alignment of each cup C with the path of travel of the movement of carrier tongs 26c, the hooked end 28k of gate 28j moves in and out of effective position in timed relation with the operation of said nesting.

As is clear from Figs. 4 and 5, accidental movements of the cups C when discharged on conveyor belt 28a and also units U after nesting may be avoided, if desired, by suitable means provided, as for example, by making mid-portion of said belt 28a with spaced apart through slits 28x along the length thereof which pass over inlet vents 33a of an air suction duct 33 on which an upper portion of said belt 28a rides and which replaces a length of level retaining plate 28h for a distance from the cup discharge position under said forming portion 25 to the shelf 28s. Said air suction duct 33 may be connected by an outlet pipe 33b to a suitably relatively low vacuum system in any well understood manner.

Said units U on cross conveyor 28 are then advanced to ramp 28t where a group row, corresponding to the number of adjoining compartments of box A to be simultaneously filled, here shown as four, are shoved off the apron or shelf 28s and forwardly down said ramp 28t by the bumper 29b of vehicle pusher 29, said ramp 28t and movements of vehicle pusher 29 being so constructed and arranged as to move the row of said group units U into stalls 28v to align the bottom ends of the cups C with passageways 28w, whereupon a row of plug plunger members 31q which are spaced apart correspond to stalls 28v carried by angle bar 31p descend, pressure forcing, that is, tamping the row of units U completely through the passageways 28w and into the underlying compartments of box A, the latter being advanced in timed relation, as is clear from Figs. 6 and 7.

It should be noted that each of the adjoining compartments of boxes A are of a uniform cross-sectional area less than the normal spread of the open end of cups C, that is, the over-all effective cross-sectional area thereof, so that when the units U are tamped into said box compartments the cup side walls W are springably flexed against the walls of crate-partitions D and sides of box A thereby being cushioned against damage to form a protective housing for shockproofing the candies L when fully inserted into said box compartments. The stalls 28v and passageways 28w, which have no greater cross-sectional area than said box compartments, may serve in one step of the improved method as a sizing gage template means facilitating the insertion of the rows of units U into said box compartments by reducing the normal spread of the cup walls W which are resilient to fractionally contact in cushioned position as aforesaid.

Then the cycle of steps outlined above are continued automatically to fill and deliver boxes A with units U shockproof packaged on conveyor 30 by a method of operation not believed possible heretofore for fragile comestibles and more particularly chocolate candies having a liquid or juicy fruit content.

It is thus seen that there is provided an improved method and apparatus for packaging comestibles whereby the several objects of this invention are achieved and which are well adapted to meet the conditions of practical use.

As various possible embodiments might be made of the above invention, and as various changes might be made in the embodiments above set forth, it is to be understood that all matters herein set forth or shown in the accompanying drawings are to be interpreted as illustrative and not in a limiting sense.

Having thus described my invention, I claim as new and desire to secure by Letters Patent:

1. A packaging method for filling containers formed with a row of adjoining compartments each of same predetermined shape and uniform cross-sectional area for protectively housing a comestible unit assembled with an end thereof nested in a resilient side walled cup of frustroconical shape having an effective cross-sectional area at an open end thereof at least as great as said compartment area and a bottom of less cross-sectional area so that when said nested comestibles are fully inserted in said compartments they are cushioned against damage due to shock and rough handling of the filled container, the steps of moving said nested comestible units in an alignment row corresponding to the spacing of said compartments and in register therewith, and then tamping said aligned row of units through a sizing gage template having a corresponding row of spaced apart through-openings, each of the latter having no greater cross-sectional area than said compartment to cause each nested comestible unit to fully enter into the compartment against frictional contact of the resilient cup side walls cushioned as aforesaid.

2. A packaging method for filling containers as defined in claim 1 including the step of first nesting each individual comestible in said cup before moving the nested comestibles in said alignment row.

3. A packaging method for filling containers as defined in claim 1 including the steps of first forming individual cups from a strip of sheet material, next moving a succession of comestible units into registered alignment with the formed cups and nesting same therein prior to said tamping step.

4. A packaging method comprising the steps of making cups with crinkled side walls from a strip of sheet material and depositing said cups in spaced apart sequence, moving the spaced cups along a predetermined horizontal path, moving confection pieces in a row along a horizontal second path in angular relation to said first mentioned path, synchronously transferring said pieces to nest in the cups to form units along said first mentioned path in a row, moving cartons with crate-partitions forming rows of adjoining individual compartments each of a cross-sectional area no greater than the normal over-all cross section of a cupped confection unit along a horizontal third path in angular relation to and below the level of said first mentioned path, moving a portion of said row of nested confection units into registered alignment with respect to said adjoining carton compartment, and pressure fitting said aligned row of units into the carton compartments.

5. An apparatus for filling containers formed with rows of adjoining compartments, each of predetermined cross-sectional area for protectively housing a comestible unit having an end thereof nested in resilient side walled cup of greater effective cross-sectional area than said container compartment so that when each of said units is fully inserted in a container compartment it will cushion the comestible against injury due to shock and rough handling of the filled container, comprising means for making cups from a strip of sheet material in spaced apart sequence and depositing same for movement along a predetermined horizontal path, means for moving the cups along said first mentioned path, means for moving confection pieces in line sequence along a second path in angular relation to said first mentioned path, means to transfer and nest said confection pieces in timed relation into said cups along the first path, means for moving cartons having crate-partitions which subdivide the interior into rows of adjoining compartments each of a cross-sectional area less than the effective cross section of the normal over-all area cross section of a cupped confection along a horizontal third path in angular relation to and below the level of said first path, means for moving the nestled comestible units in an alignment row corresponding to the spacing of said carton compartments, a cup cross-sectional area reducing means, and means for tamping said alignment row nested comestibles through said cup cross-sectional area reducing means and beyond for insertion into the carton compartments in register therewith after which said reduced area expands to frictionally engage with the interior walls of the compartments to provide shock resistant cushioning means in the filled carton.

6. An apparatus as defined in claim 5 in which said reducing means includes a gage template formed with through-openings for passage of said units into a carton compartment.

7. A packaging apparatus of the character described comprising, a first, a second and a third conveyor, means for making crinkled side wall cups from sheet material and depositing same in spaced apart relation on said first conveyor moving along a predetermined path, means for moving confection pieces in a row on said second conveyor along a path in angular relation to said first mentioned path, means for synchronously transferring said pieces to nest in the cups forming units in a row on said first conveyor, means for moving cartons with crate-partitions forming rows of adjoining individual compartments on siad third conveyor along a path in angular relation to and below the level of said first mentioned path, means for moving portions of the row of nested units into registered alignment with respect to said adjoining box compartments on the third conveyor, means for inserting said row portions of aligned units into a corresponding number of said box compartments, and means for operating the aforementioned means in successive sequence and in timed relation cycles to package said units to fill all the box compartments.

8. A packaging apparatus of the character described comprising, a first and a second conveyor, means for making crinkled side wall cups from sheet material and depositing same in spaced apart relation on said first conveyor moving along a predetermined path, means for inserting confection pieces into each of said cups forming nested units on said first conveyor, means for moving cartons with crate-partitions having rows of adjoining individual compartments on said second conveyor below the level of said first mentioned path, means for transferring a predetermined number of said nested units from said first conveyor into registered alignment with respect to a row of said adjoining box compartments on said second conveyor, means for inserting said aligned nested units into said row of box compartments on said second conveyor, and means for operating the aforementioned means in successive sequence and in timed relation cycles to package said units to fill all box compartments.

9. A packaging apparatus portion supplied with crinkled side wall cups carried on a first conveyor moving along a predetermined path; with confection pieces carried on a second conveyor; and with crate-partitioned cartons having adjoining individual compartments carried on a third conveyor; comprising means for removing said confection pieces from the second conveyor and depositing same into each of the cups to form nested units on the first conveyor, means for transferring into registered alignment and inserting a plurality of said nested units corresponding to the number in a row of adjoining box compartments on the third conveyor from the first conveyor into said row of box compartments on the third conveyor, and means for operating the aforesaid means in successive sequence in timed relation to package said nested units for filling all box compartments.

10. In a packaging method for filling boxes having a row of compartments with a cup nested comestible in each compartment including the steps of first forming individual cups from a strip of sheet material, moving said cups and a succession of comestibles into an alignment relation, nesting each comestible in a cup, moving the nested comestibles in rows corresponding to said box compartments to be filled, and tamping said rows of cup nested comestibles through a sizing gage template to reduce a normal spread of the cups while entering into said box compartments to be filled.

11. In a packaging method, the steps of moving individual cups formed with crinkled flexing side walls along a first path in spaced apart sequence, moving confection pieces along a second path in a row, transferring and depositing each of said confection pieces from a point at the end of travel along the second path to nest in each cup to form a unit along the first path, simultaneously moving a row of advancing units into registered alignment with a plurality of adjoining box compartments moving in a third path, inserting each unit of said row of aligned units into one of said box compartments including temporarily reducing a normally spread cross-sectional area of each cup unit in size while entering into the box compartment.

12. In a packaging method for filling boxes having a row of compartments with a cup nested confection piece in each compartment, the steps of first forming individual cups from a strip of sheet material and moving the cups along a first path in spaced apart sequence, moving confection pieces along a second path in a row, transferring and depositing each of said confection pieces from a point at the end of travel along the second path to nest in each cup to form an open top unit along the first path, simultaneously moving a row of advancing open top units into registered alignment with said row of box compartments moving in a third path, and inserting each open top unit of said row of units into one of said box compartments.

13. In a packaging method for filling boxes having a row of compartments with a cup nested confection piece in each compartment, the steps of first forming individual cups from a strip of sheet material and moving the cups along a first bath in spaced apart sequence, moving confection pieces along a second path in a row, transferring and depositing each of said confection pieces from a point at the end of travel along the second path to nest in each cup to form an open top unit along the first path and while simultaneously delaying the advancing movement of each cup in said first path to intercept the confection piece being transferred and deposited therein.

14. A packaging apparatus supplied with cups having corrugated side walls capable of being flexed to reduce the normal cross-sectional area of the interior space thereof, fragile confection pieces having liquid centers and cartons formed with a row of compartments each shaped and sized to have an effective cross-sectional area less than that of said cup, comprising means for nesting each of the confection pieces in a cup to form a unit, means for transferring into registered alignment and inserting a plurality of nested units into corresponding compartments of said carton, means for reducing the normal cross-sectional area of said cup of each nested unit during the operation of said inserting means, and means for operating said nesting and last mentioned means in successive sequence in timed relation to package said nested units for fitting the carton.

15. A packaging apparatus supplied with candy pieces nested in cups having corrugated flexible side walls capable of having the normal spread cross-sectional area thereof reduced, said candy pieces and cups forming units carried on a first conveyor moving along a predetermined path, and supplied with crate-partitioned boxes having adjoining individual compartments carried on a second conveyor in angular relation and below the level of said first conveyor; comprising means for transferring into registered alignment each of said units with a box compartment, means for inserting the aligned units into the box compartments including means for reducing said normal spread cross-sectional area of the cups, and means for operating said transfer and inserting means in successive sequence in timed relation to package the nested units in the box compartments.

References Cited in the file of this patent

UNITED STATES PATENTS

| 1,243,408 | Hawthorne | Oct. 16, 1917 |
| 1,247,722 | Rogers et al. | Nov. 27, 1917 |
| 1,692,429 | Wanders | Nov. 20, 1928 |
| 2,415,292 | Lamb et al. | Feb. 4, 1947 |
| 2,633,280 | Davies | Mar. 31, 1953 |